Nov. 30, 1954  W. F. OCENASEK  2,695,637
BAND SAWING MACHINE
Filed Oct. 5, 1950  7 Sheets-Sheet 1

INVENTOR.
William Ferdinand Ocenasek
BY
Elroy J Wutschel
Attorney

Nov. 30, 1954 W. F. OCENASEK 2,695,637
BAND SAWING MACHINE
Filed Oct. 5, 1950 7 Sheets-Sheet 2
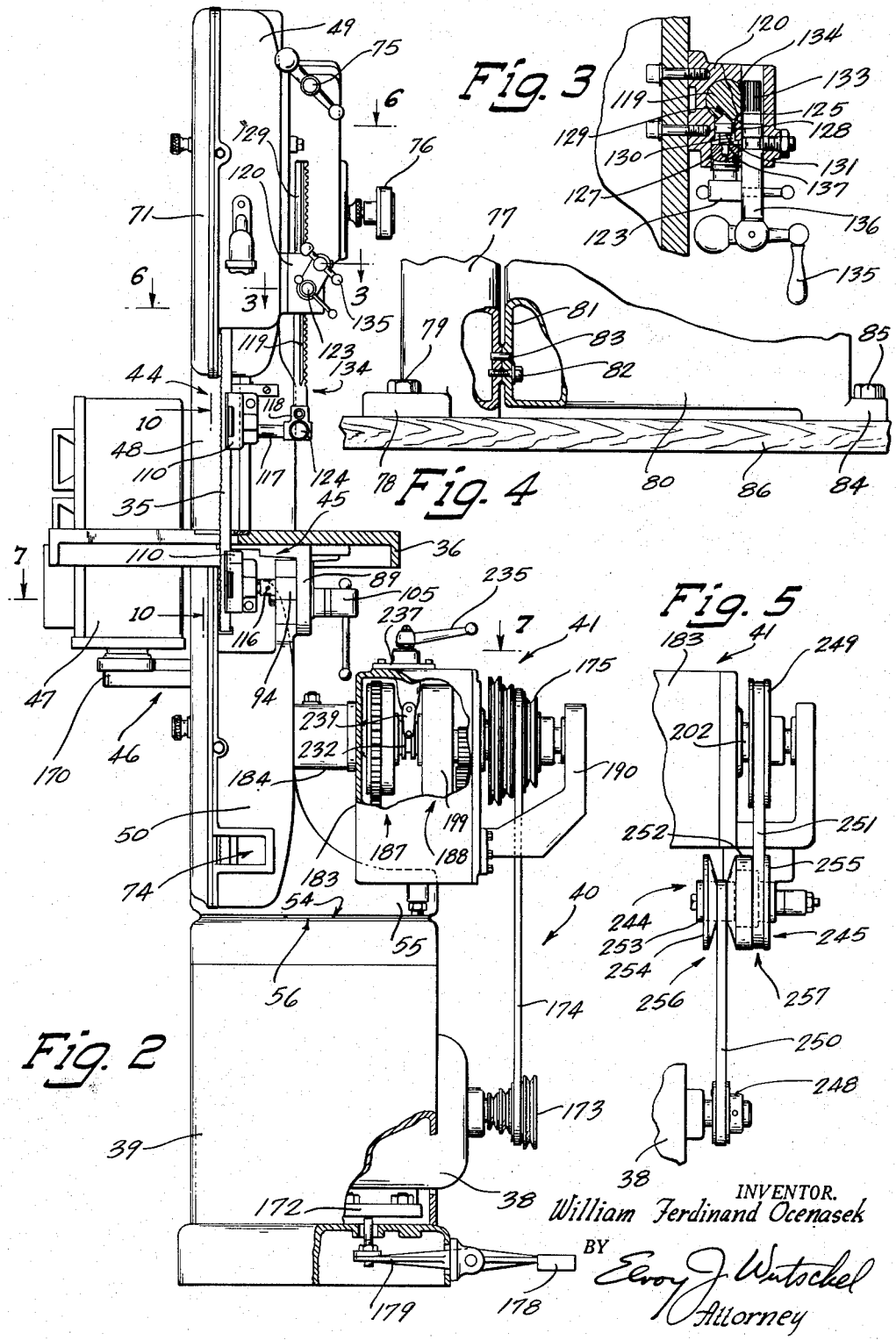
INVENTOR.
William Ferdinand Ocenasek
BY
Elroy J. Wutschel
Attorney Nov. 30, 1954 W. F. OCENASEK 2,695,637
BAND SAWING MACHINE
Filed Oct. 5, 1950 7 Sheets-Sheet 3
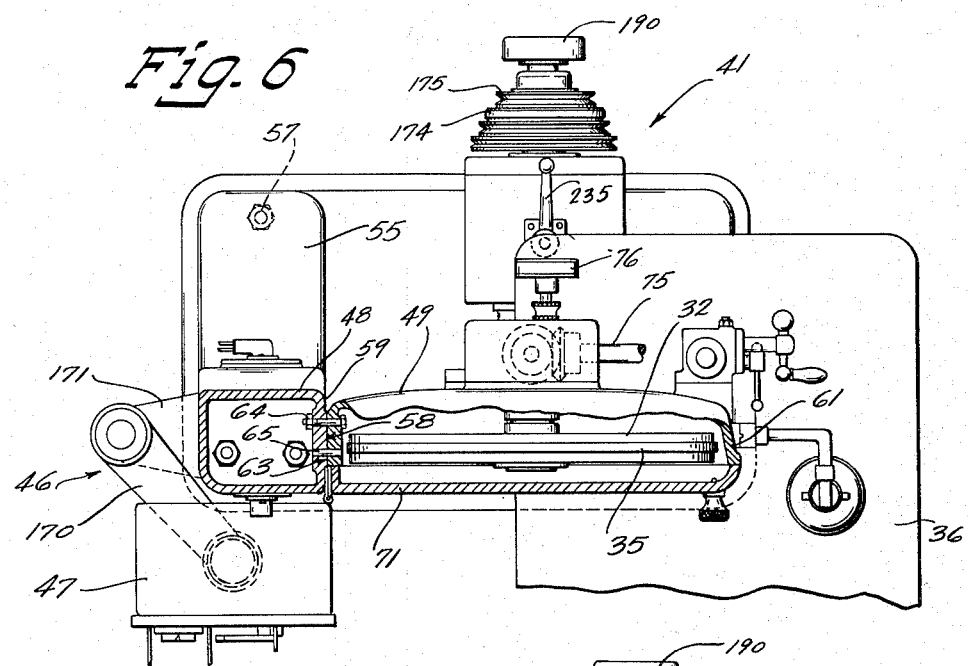
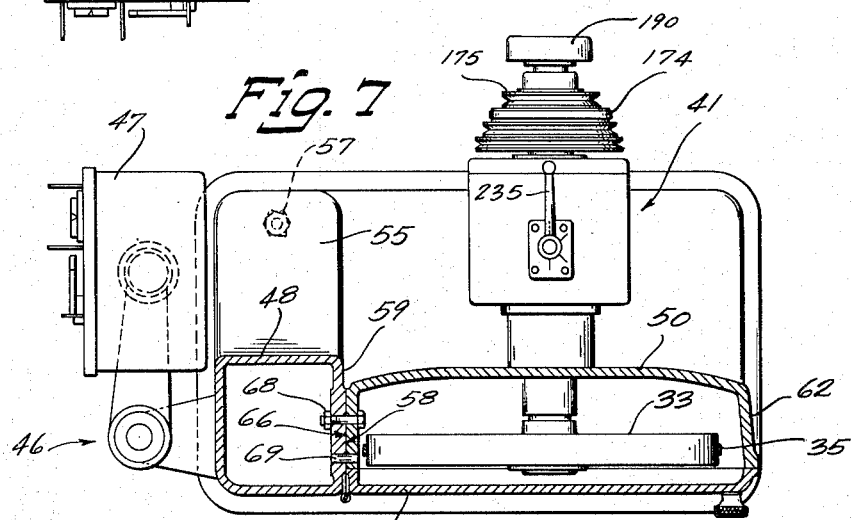
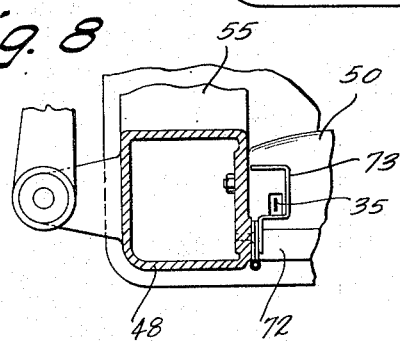
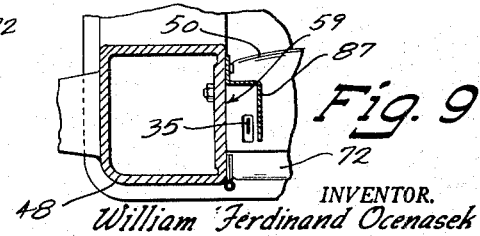
INVENTOR.
William Ferdinand Ocenasek
BY
Attorney Nov. 30, 1954  W. F. OCENASEK  2,695,637
BAND SAWING MACHINE
Filed Oct. 5, 1950  7 Sheets-Sheet 4
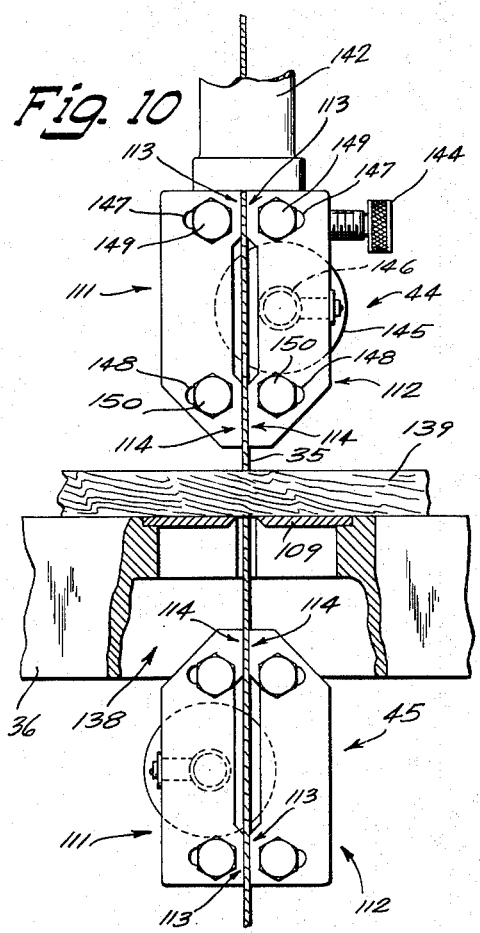
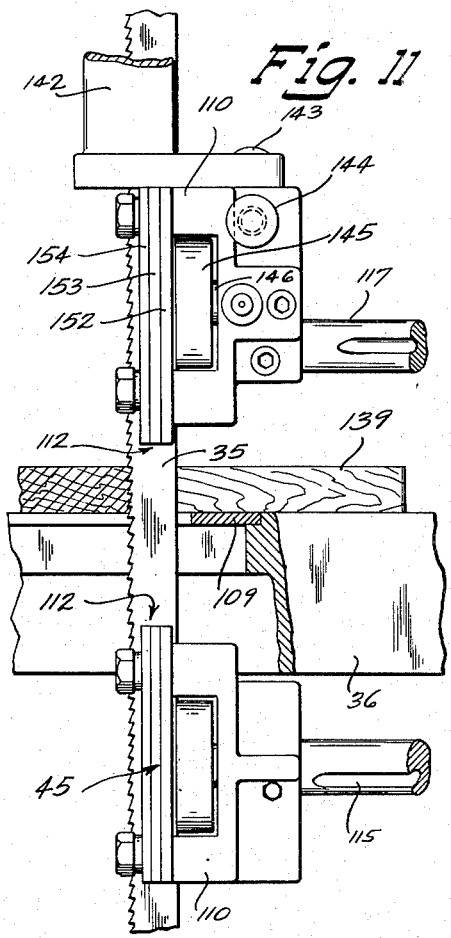
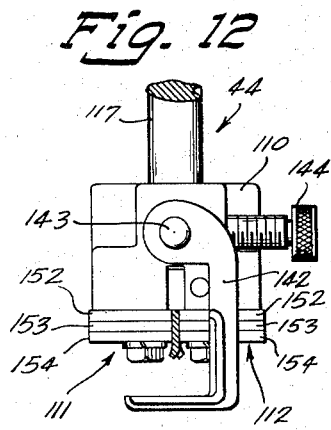
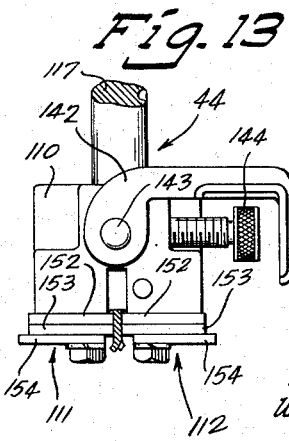
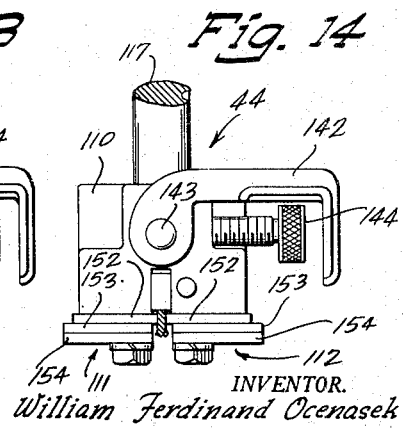
INVENTOR.
William Ferdinand Ocenasek
BY
Attorney Nov. 30, 1954  W. F. OCENASEK  2,695,637
BAND SAWING MACHINE
Filed Oct. 5, 1950  7 Sheets-Sheet 5

INVENTOR.
William Ferdinand Ocenasek
BY
Elroy J Wutschel
Attorney

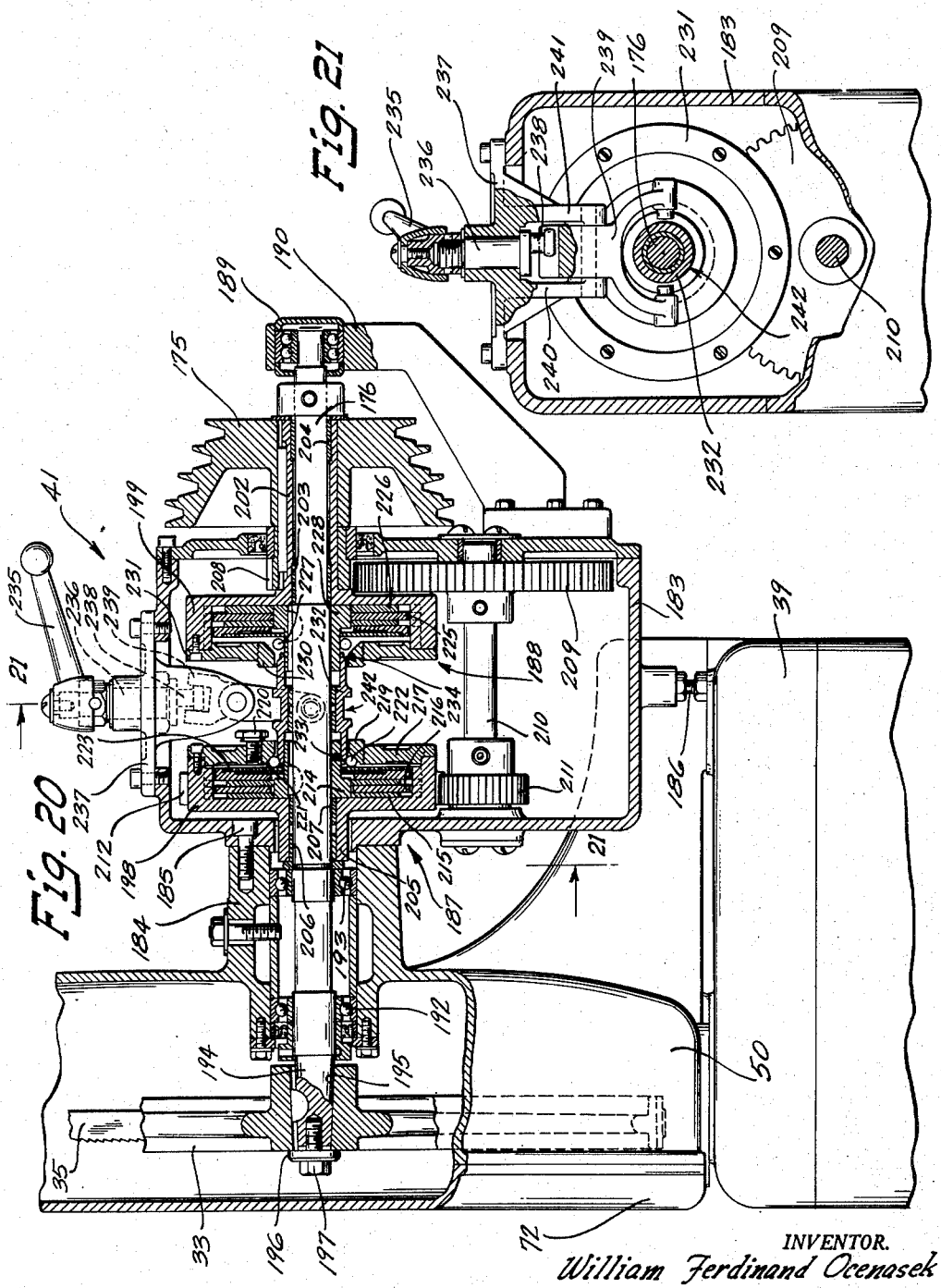

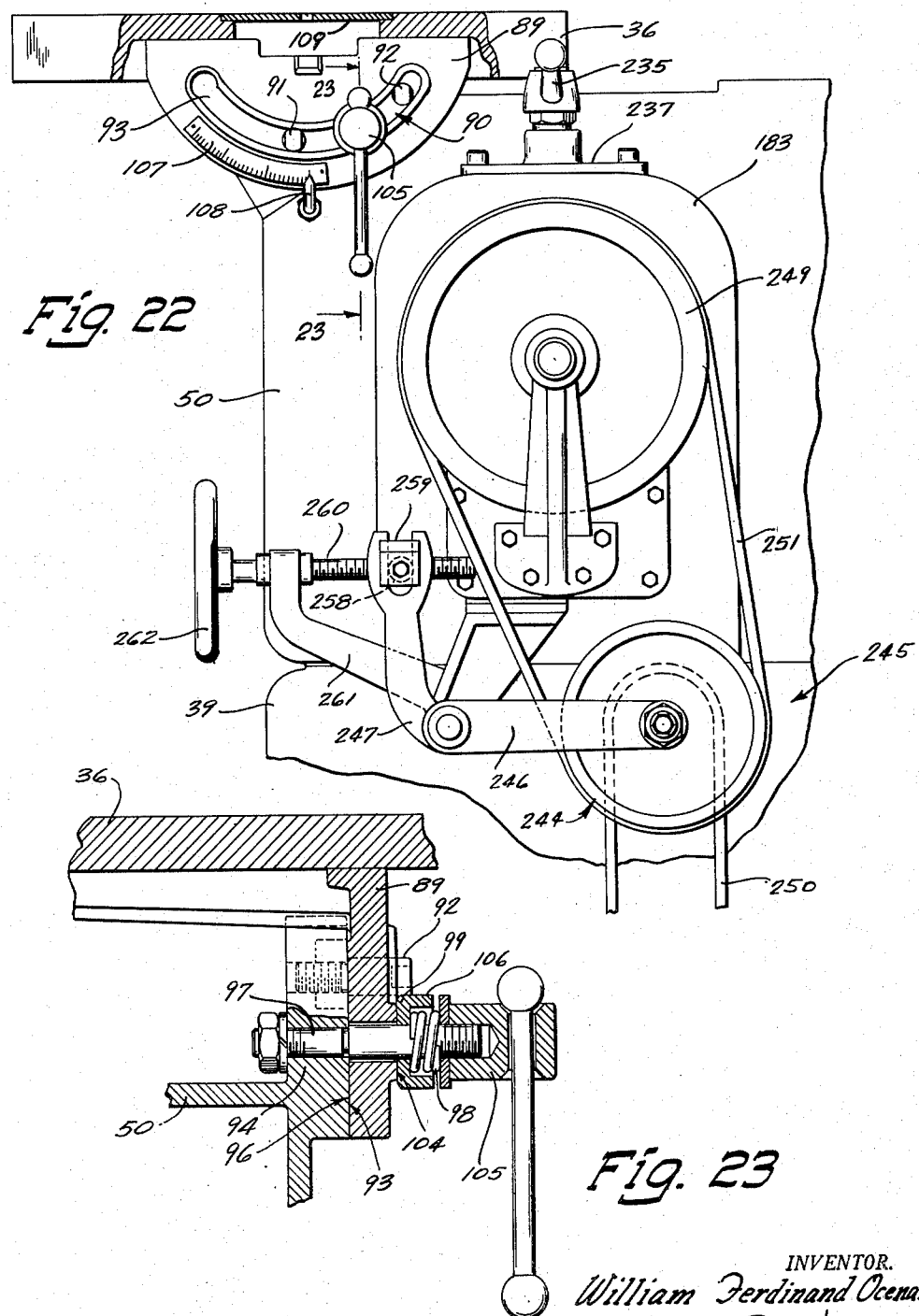

United States Patent Office 2,695,637
Patented Nov. 30, 1954

2,695,637

BAND SAWING MACHINE

William Ferdinand Ocenasek, South Plainfield, N. J., assignor to Kearney & Trecker Corporation, West Allis, Wis., a corporation of Wisconsin Application October 5, 1950, Serial No. 188,616

9 Claims. (Cl. 143—17)

This invention relates generally to improvements in the construction of a band sawing machine and more particularly to improved supporting structure for a selectively operable continuous or endless saw band.

A general object of the invention is to provide an improved band saw having greatly improved operating characteristics for more conveniently performing a wide variety of sawing operations.

Another general object of the present invention is to provide improved structure for supporting and controlling the sawing mechanism of a band saw.

Another object is to provide an improved band saw having its various component parts so arranged as to simplify the manufacture and reduce the cost of producing an improved machine.

Another object is to provide an improved supporting frame for a band saw that comprises a plurality of separate units arranged to be secured together in such manner as to constitute a rigid unitary structure for supporting and partially enclosing the sawing mechanism.

Another object is to provide an improved frame for a band saw that is provided with improved protective wheel housings adapted to be adjustably secured to a supporting column in predetermined spaced apart alignment.

Another object is to provide an improved unit type frame for a band saw.

A still further object of the invention is to provide an improved band sawing machine having improved supporting structure adapted to provide the utmost economy in manufacture.

According to this invention, a band sawing machine is provided with a generally C-shaped supporting frame of an improved unit type construction that is disposed to support in vertically spaced relationship a pair of guiding wheels about which is trained a continuous or endless saw band. The supporting frame comprises a plurality of functionally shaped individual units formed and secured together in such manner as to constitute an extremely rigid structure for supporting and partially enclosing the sawing mechanism.

The foregoing and other objects of this invention, which will become more fully apparent from the following detailed specification setting forth the several illustrative embodiments, may be achieved by the particular apparatus constituting an exemplifying embodiment of the invention that is depicted in and described in connection with the accompanying drawing, in which:

Fig. 2 is a view in front elevation of the machine including the variable speed driving transmission mechanism and having a part of the housing for the range changing mechanism broken away to show a part of the driving mechanism for the lower saw guiding wheel;

Fig. 3 is an enlarged detailed view in horizontal section through the elevating and clamping mechanism for the upper saw guide taken approximately along the plane represented by the line 3—3 in Fig. 2;

Fig. 4 is an enlarged fragmentary view in left side elevation of the lower part of a modified form of a supporting frame;

Fig. 5 is a diagrammatic view of a modified form of variable speed transmission mechanism interconnecting the driving motor and the range changing mechanism;

Fig. 6 is a plan view of the machine, partly in horizontal section through the upper wheel support, showing the welding apparatus supported in an operating position adjacent a side wall of the column and taken on the plane represented by the line 6—6 in Figs. 1 and 2;

Fig. 7 is a plan view of the machine, partly in horizontal section through the lower wheel support, showing the welding apparatus supported in its parked or storage position rearwardly of the column and taken along the horizontal plane represented by the line 7—7 in Figs. 1 and 2;

Fig. 8 is a fragmentary view in horizontal section through the central portion of the column intermediately of the upper and lower wheel supports and taken on a plane represented by the line 8—8 in Fig. 1;

Fig. 9 is a view in horizontal section through the central portion of the column, showing a modified form of stationary saw guard positioned intermediately of the upper and lower wheel supports;

Fig. 10 is an enlarged detailed view in front elevation of the upper and lower saw guides including a fragmentary representation in vertical section of the work supporting table interposed therebetween and taken on a plane represented by the line 10—10 in Fig. 2;

Fig. 11 is an enlarged detailed view in right side elevation of the upper and lower saw guides taken on a plane represented by the line 11—11 in Fig. 1;

Fig. 12 is a plan view of the upper saw guide showing the individually opposed guide plates in saw guiding engagement;

Fig. 13 is a plan view similar to Fig. 12 showing the outer opposed guide plates in retracted position;

Fig. 14 is a plan view similar to Fig. 12 showing only the innermost opposed guide plates in saw guiding engagement;

Fig. 20 is a view in vertical transverse section through the range changing transmission mechanism and a part of the lower wheel support;

Fig. 21 is a view in vertical longitudinal section through the range changing transmission mechanism taken on a plane represented by the line 21—21 in Fig. 20;

Fig. 22 is an enlarged view in right side elevation of the lower portion of the machine and showing the modified form of speed changing transmission mechanism; and, Fig. 23 is a view in transverse vertical section of the table support bracket and the table clamping mechanism taken on a plane represented by the line 23—23 of Fig. 22.

Figure 1:
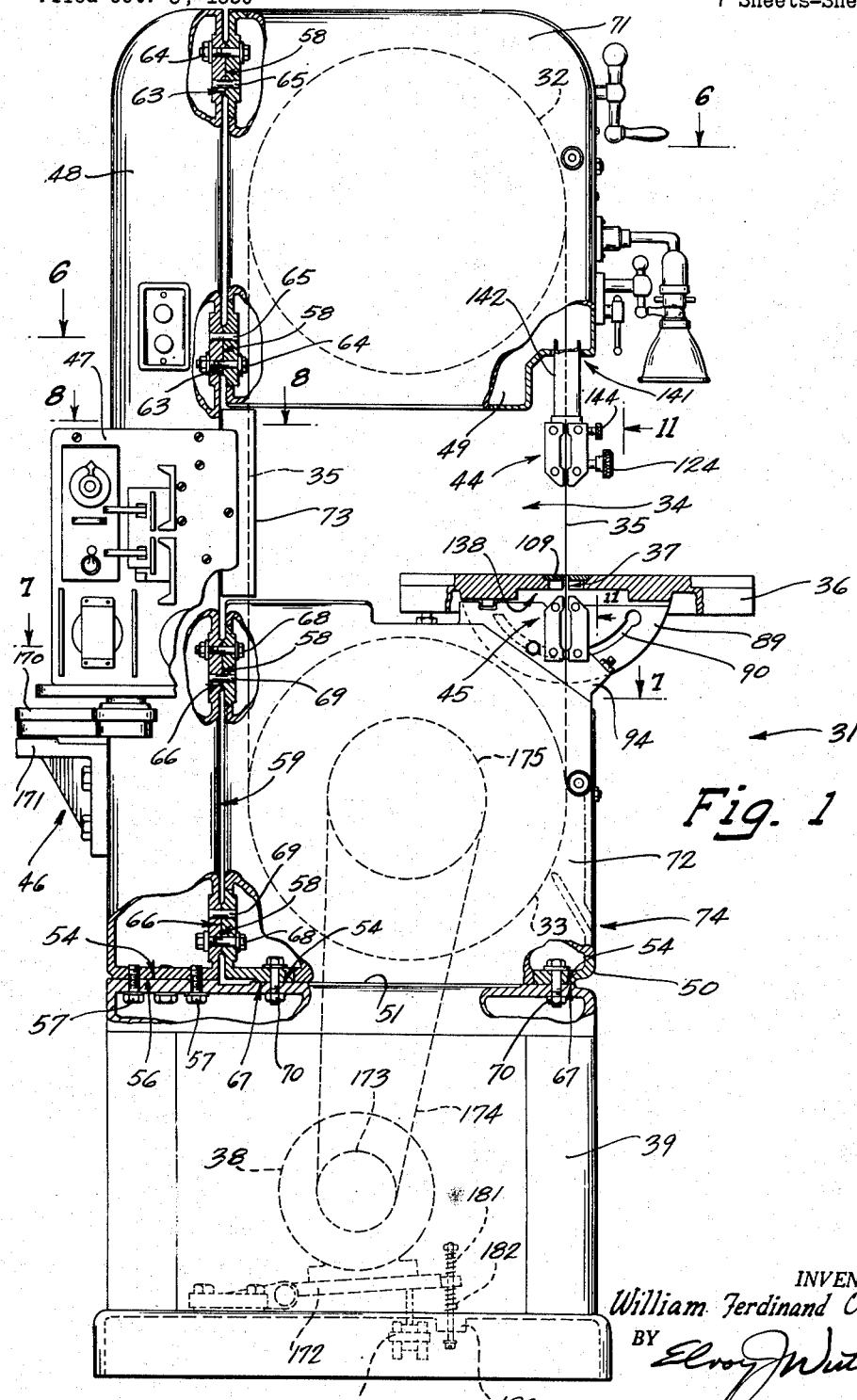
Figure 1 is a view in left side elevation of a band sawing machine in which the invention is embodied in practical form, parts of the machine frame having been broken away to show more clearly the unit type construction thereof.

Referring more specifically to the drawings, Figs. 1 and 2 thereof in particular, show generally in side and front elevation a band sawing machine that is fully described herein by way of a complete disclosure of preferred structure embodying the features of this invention. As shown in these views, it may be seen that the machine comprises essentially a generally C-shaped supporting frame 31 of an improved unit type construction that is disposed to rotatably support upper and lower saw guiding wheels 32 and 33 respectively in vertically spaced relationship. The frame 31 defines an open throat 34 constituting a working zone through which a workpiece may be fed to the forward run of a continuous or endless saw band 35 trained about the saw guiding wheels 32 and 33.

To support a workpiece during a sawing operation, there is provided toward the front central portion of the machine a normally horizontal work supporting table 36 carried by the frame 31 in position to define the lower limit of the open throat 34 formed thereby and which is provided with a slotted opening 37 to permit vertical movement of the forward stretch of the saw band 35. Power for driving the saw band 35 at a selected rate of speed in a high or low range is derived from a motor 38 mounted within the lower hollow portion of the machine frame 31 and connected through a speed changer 40 to drive a range changing mechanism 41 which, in turn, is connected to drive the lower saw guiding wheel 33.

In order to guide the saw band 35 for straight line movement through the open throat 34 constituting the working zone, a pair of laminated saw band guides 44 and 45 are carried by the supporting frame 31 in vertically spaced relationship above and below the work supporting table 36 and are disposed to be individually adjustable to accommodate varying widths and thicknesses of saw bands. A parking bracket 46 secured to the central rearward portion of the machine frame 31 is arranged to support a welding apparatus 47 that is operative to weld together the ends of the saw band 35 in the event the band is severed.

The supporting frame 31 is of unit type construction and comprises a plurality of structural components including a hollow supporting base 39, a vertically upstanding column 48 secured to the upper surface of the base, and a pair of wheel supports 49 and 50 secured to the forward wall of the column, the lower support 50 also being secured to the upper surface of the base 39. The structural components constituting the machine frame 31 are so formed as to reduce the cost of manufacture and to facilitate assembly of the machine, as well as to provide an extremely rigid framework for supporting the sawing mechanism including the guide wheels 32 and 33 and the endless saw band 35 carried thereby.

As shown in Figs. 1 and 2, the hollow base 39 is rectangular in form and is provided on its upper surface 51 with a plurality of mounting pads 54 so arranged as to require a minimum of time for machining and disposed to receive the vertical column 48 and the lower wheel support 50. The vertical column 48 is of generally rectangular cross section throughout approximately the upper four-fifths of its length and is provided at its extreme lower end with an integrally formed, laterally extending foot or extension 55 disposed to cooperate with the upper surface 51 of the base 39 for restraining the column against lateral deflection, as shown in Figs. 1, 2 and 6. The undersurface of the vertical column 48, including its lateral extension 55, is provided with a machined surface 56 adapted to cooperate with the rearward mounting pad 54 on the base 39 and is secured thereto by means of bolts 57. A plurality of vertically spaced mounting pads 58 are likewise formed on a forward vertical face 59 of the column 48 to receive the upper wheel support 49 and the lower wheel support 50 respectively, the wheel supports being positioned in a vertical plane that is transverse to the plane of the column extension 55, as shown in Figs. 2, 6 and 7.

As shown in the drawings, the upper wheel support 49 and the lower wheel support 50 are of generally rectangular or box-like shape respectively provided with integrally formed peripheral flanges 61 and 62 extending outwardly to form hollow open-sided housings arranged to partially enclose the upper guiding wheel 32 and the lower guiding wheel 33, respectively. The upper wheel support 49 is provided on the rearward face of its integrally formed peripheral flange 61 with vertically spaced mounting pads 63 disposed to cooperate with the upper mounting pads 58 formed on the front face of the vertical column 48 and is secured thereto by means of bolts 64 and dowels 65. The lower wheel support 50 is provided on the rearward face and on the underside of its integrally formed peripheral flange 62 with mounting pads 66 and 67 respectively arranged to cooperate with the pads 58 formed on the front face of the column 48 and the pads 54 formed on the top surface of the supporting base 39. The lower wheel support 50 is secured at its rearward edge to the front face of the column 48 by means of bolts 68 and dowels 69 and to the top surface of the supporting base 39 by means of bolts 70. Since the vertical plane of the wheel supports 49 and 50 is perpendicular to the plane of the laterally extending column extension 55, as shown in Figs. 2, 6 and 7, this arrangement provides for rigidly supporting the column and restraining it against deflection in mutually transverse planes.

The wheel supports or housings 49 and 50 cooperate with the column 48 for retaining the upper and lower guiding wheels 32 and 33 respectively, in rigid vertically spaced relationship and are so formed as to enclose a side face and the peripheral edge of each of the guiding wheels. A pair of access doors 71 and 72 shown in Figs. 1, 6 and 7 are hinged at their rearward edges to the front face 59 of the column in manner to form closures for the open sides of the housings 49 and 50 and cooperating therewith for completely enclosing the guide wheels 32 and 33 to afford protection to a machine operator during operation of the machine. Further protection is provided by a rectangular U-shaped saw guard 73 hinged to the front face 59 of the column 48 between the upper wheel support 49 and the lower wheel support 50 in manner to enclose the rearward stretch of the saw band 35 extending therebetween as shown in Figs. 1 and 8.

The lower wheel support 50 is provided toward its lower forward portion with a tubular dust chute 74 of generally rectangular cross section disposed to extend angularly upward toward the periphery of the lower guide wheel 33 for removing sawdust formed by the downwardly moving forward stretch of the saw band 35 during a cutting operation, as shown in Figs. 1 and 2. The dust chute 74 is adapted to be connected to a vacuum system (not shown) in well known manner.

To vary the tension of the saw band 35 about the guide wheels 32 and 33, the upper guide wheel 32 is arranged to be both angularly and vertically adjustable relative to the lower wheel 33. As shown in Figs. 2 and 6, a rotatable shaft 75 is operatively connected to effect bodily vertical adjustment of the upper guide wheel 32 and a control knob 76 is arranged to effect angular adjustment thereof.

In a modified form of supporting framework for the machine shown in Fig. 4, the lower portion of the column together with the lower wheel support are so formed as to facilitate securing the machine to any convenient supporting base. As there shown, a vertically upstanding column 77 of substantially rectangular cross section throughout its entire length is provided at its lower end with a pair of laterally extending mounting lugs integrally formed with the front and rear walls of the column in manner to extend perpendicularly therefrom. The extending mounting lugs are provided with bored holes adapted to receive mounting bolts, only the forward mounting lug 78 secured to the front wall of the column 77 and a mounting bolt 79 being shown in Fig. 4. A lower wheel support 80 secured at its rearward peripheral edge 81 to the front wall of the column 77 by bolts 82 and dowels 83 is provided at its lower forward portion with an integrally formed forwardly extending mounting lug 84 having a bored hole adapted to receive a mounting bolt 85. Thus, the mounting lug 84 secured to the lower wheel support 80, together with the rear mounting lug (not shown) and the front mounting lug 78 secured to the column 77, provide a three point mounting arrangement for rigidly securing the machine frame to a suitable base 86 at triangularly spaced positions.

In a modified form of saw guard for enclosing the rearward stretch of the saw band 35, as shown in Fig. 9, there is provided an L-shaped stationary guard member 87 secured to the front wall 59 of the vertical column 48 intermediately of the upper wheel support 49 and the lower wheel support 50.

Included among the principal advantages afforded by the described unit type construction of the supporting frame 31 are the simplicity of manufacturing an extremely rigid supporting frame for a band saw, as well as the great reduction in the cost of manufacture. These advantages result primarily from the particular form of the generally rectangularly shaped units constituting the frame 31, including the supporting base 39, the vertical column 48, the upper wheel support 49, and the lower wheel support 50. Each one of the units comprising the frame 31 is provided with a plurality of mounting pads that are adapted to facilitate assembly, and are arranged in such manner as to require a minimum time for machining and fitting as a prerequisite to assembly. It will be apparent that the upper and lower wheel supports can be positioned and secured to the supporting column in a selected position of vertical alignment to facilitate and reduce the time required for aligning the upper and lower saw guiding wheels. Inasmuch as the units are preferably cast in the particular shape required, and since a minimum of machining time is required, considerable economy is thus effected in the manufacture of the individual units. Likewise, the size and weight of each of the units is sufficiently reduced to facilitate handling during assembly of the machine, as well as to reduce the space required for storing these units in order to maintain the necessary inventory of parts.

The generally rectangular form of the units also serves to simplify assembling them together into a unitary frame structure in which the several constituent parts are arranged to cooperate in manner to provide maximum rigidity for supporting the sawing mechanism. Although each of the units is formed in a functional manner to contribute to the rigidity as well as to the overall appearance of the unitary frame structure, the upper wheel support 49 and the lower wheel support 50, in particular, are so formed as to provide maximum utility in performing the dual function of both supporting and partially enclosing the upper and lower saw guiding wheels respectively. This arrangement obviates the necessity of providing the usual separate, lighter weight wheel housings normally secured to the arms of a C-shaped machine column disposed to rotatably carry a pair of saw guiding wheels, and at the same time, serves to minimize vibration during operation of the machine.

A still further advantage of this type of unit construction of a band saw frame is the simplicity and convenience with which one unit may be substituted for another, in the event it is necessary to repair the supporting frame for the machine after it has been placed in operation.

As shown in Figs. 1, 22 and 23, the work supporting table 36 is pivotally supported toward the upper forward portion of the lower wheel support 50 for angular adjustment through an arc of approximately 45° from a normally horizontal position. To adjustably support the table 36 for pivotal movement, a bracket 89 perpendicularly secured to the underside of the table 36 is provided with an arcuate slot 90 disposed to engage a pair of horizontal guide pins 91 and 92 extending outwardly from a flat vertical bearing surface 93 formed on the side face of a mounting plate 94 that extends upwardly from the upper forward portion of the lower wheel support 50. The horizontal guide pins 91 and 92, Fig. 22, are so spaced and located with reference to the arcuate slot 90 as to guide the table 36 for pivotal adjustment about an axis formed by the intersection of the horizontal plane of the table surface and the vertical plane of the saw band 35.

A complementary flat bearing surface 96 formed on the inner side face of the table bracket 89 is disposed to be normally retained in frictional guiding engagement with the flat vertical bearing surface 93 formed on the mounting plate 94 secured to the lower wheel support 50 during pivotal adjustment of the table 36. To effect this result, a horizontally disposed stud 97 secured at its inner end to the vertical mounting plate 94 and extending outwardly through the arcuate slot 90 formed in the table bracket 89 is encircled toward its outer end by a spring 98 contained within a cup shaped washer 99 carried by the stud in manner to be interposed between the outer face 104 of the bracket and a locking member 105 threadedly secured to the extreme outer end of the stud. With the locking member 105 in disengaged or unclamped position, as shown in Fig. 23, the spring 98 is disposed to exert pressure between the member 105 and the bracket face 104 in manner to urge the flat bearing surface 96 formed on the inner side thereof into frictional engagement with the vertical guiding surface 93 of the mounting plate 94. The resilient force exerted by the spring 98 is sufficient to retain the table 36 in any selected position of angular adjustment without preventing a further manual adjustment thereof.

To clamp the table 36 immovably to the lower wheel support 50 in a selected position of angular adjustment, the clamping member 105 is operative to engage a peripheral flange 106 integrally formed with the cup shaped washer 99 to urge the table bracket 89 into stationary clamped engagement with the vertical mounting plate 94. Thus, the spring 98 is protected against being fully compressed whenever the clamp member 105 is moved into full clamped position because of the fact that it is fully enclosed within the outwardly extending peripheral flange 106 of the cup shaped washer 99.

To indicate the degree of pivotal adjustment of the table 36, an indicating scale 107 secured to the table bracket 89 is provided with indicia arranged to cooperate with a pointer 108 secured to the mounting plate 94.

To provide clearance for the saw band 35 as the table 36 is angularly adjusted, the table is apertured to receive a circular plate 109, Figs. 1 and 2, which is provided with a slot corresponding to the table slot 37 for permitting vertical movement of the saw band.

As shown in Figs. 1 and 2, the upper saw guide 44 and the lower saw guide 45 are respectively carried in vertically spaced relationship toward the front of the machine by the upper and lower wheel supports 49 and 50 and are positioned above and below the machine table 36 in manner to engage the forward stretch of the saw band 35. As shown in Figs. 2, 10 and 11, each of the saw band guides 44 and 45 is of generally similar construction and includes a frame or support block 110 disposed to carry a pair of opposed laminated guide members 111 and 112 for independent adjustment toward or away from each other in manner to define a guiding slot of appropriate width and depth to accommodate the saw band 35. To guide the stretch of the saw band 35 extending between the guide members 44 and 45 with maximum rigidity for obtaining increased accuracy in a sawing operation, each of the pairs of opposed guide elements 111 and 112 constituting the upper and lower saw guides 44 and 45 respectively, is provided with a pair of inwardly opposed and vertically spaced saw band guiding edges 113 and 114 disposed in parallelism.

The support block 110 of the lower guide member 45 is secured to the outer end of a horizontal rod 115 slidably keyed for lateral adjustment in a bored hole formed in the table mounting plate 94 toward the upper forward portion of the lower wheel support 50 and is arranged to be clamped in predetermined adjusted position by means of a clamp screw 116 as shown in Figs. 1 and 2.

The support block 110 of the upper saw guide 44 is supported for lateral and vertical adjustment at the outer end of a horizontal rod 117 slidably keyed for lateral adjustment in a bracket 118 carried at the lower end of vertically adjustable rod 119 which, in turn, is slidably keyed in a bracket 120 bolted directly to the upper wheel support 49. A clamp screw 123 threaded in the upper bracket 120 is operative to retain the vertical rod 119 in adjusted position and a clamp screw 124 threaded in the lower bracket 118 is operative to retain the horizontal rod 117 in a predetermined position of lateral adjustment.

As shown in Figs. 2 and 3, resilient means operative in conjunction with the clamp screw 123 whenever the clamp screw is in disengaged or unclamped position are arranged to retain the vertical rod 119 in adjusted position without preventing further vertical adjustment thereof. As there shown, the bracket 120 is provided with a horizontally bored hole 125 of reduced diameter that is axially concentric with a threaded hole disposed to receive the clamp screw 123. The clamp screw 123 being of a reduced length disposed to extend only partially through the threaded hole formed in the bracket 120 is provided at its inner end with an axially concentric bored hole arranged to slidably receive an extending pilot rod 127 of reduced diameter that is secured to a plunger 128 slidably carried for axial movement within the bored hole 125 formed in the bracket 120 that is disposed to engage a complementary V-shaped. The plunger 128 is provided with a V-shaped inner end that is disposed to engage a complementary V-shaped longitudinal groove 129 formed in the vertical rod 119.

The plunger 128 is of stepped diameter, having its central portion encircled by a spring 130 that bears at one end against a shoulder 131 formed on the plunger and at its other opposite end against the inner end of the clamp screw 123. With the clamp screw 123 in disengaged or unclamped position, as shown in Fig. 3, the spring 130 is disposed to urge the inner V-shaped end of the plunger 128 into frictional engagement with the V-shaped groove 129 formed on the vertical rod 119 in manner to restrain the rod against downward and pivotal movement. Although the resilient pressure exerted by the spring 130 is sufficient to maintain the rod 119 in vertically adjusted position, it is not great enough to prevent or interfere with the manual vertical adjustment thereof.

To effect a controlled vertical adjustment of the rod 119 for varying the height of the upper saw band guide 44 above the work table 36, as shown in Figs. 1, 2 and 3, a pinion 133 journalled in the bracket to engage rack teeth 134 formed on the rod 119 is connected to be actuated by means of a control handle 135 carried on the outer end of a pinion shaft 136.

To clamp the rod 119 securely to the bracket 120 in a stationary position of vertical adjustment, the clamp screw 123 is selectively movable to engage a shoulder 137 formed by the central portion of the plunger 138 in manner to urge the V-shaped inner end thereof into locking engagement with the V-shaped groove 129 formed in the rod.

As shown in the enlarged views in Figs. 10 and 11, the lower saw band guide 45 is so positioned that the converging narrowed ends of the laminated guide members 111 and 112 carried by the support block 110 extend upwardly into a recess 138 formed in the underside of the table 36. The upper saw band guide 44 is vertically adjusted in manner that the converging narrowed ends of the laminated guide members 111 and 112 carried by the upper support block 110 are brought as close as possible to the upper surface of a workpiece, for example, the workpiece 139 carried by the table 36. Thus, the upper and lower saw guides 44 and 45 are disposed to be positioned as close as possible to the opposite sides of the workpiece 139 carried by the table 36 in manner to guide the saw band 35 and restrain it against both rearwardly and lateral movement during a sawing operation.

To accommodate varying thicknesses of workpieces, the height of the upper saw guide 44 above the table 36 may be regulated by the means of the pinion control handle 135, as shown in Figs. 2 and 3. To permit maximum upward vertical movement of the upper guide 44 for accommodating any size of workpiece that will pass through the open throat 34 constituting the working zone, the upper wheel support 49 is provided at its lower forward corner with a notched out recess 141 permitting complete retraction of the upper guide.

To enclose that portion of the saw band 35 between the upper saw guide 44 and the upper wheel support 49 for affording additional protection to a machine operator, as shown in Figs. 1 and 2, there is provided a vertical saw guard 142 disposed to extend upwardly from the upper saw guide support block 110. As shown in Figs. 12 and 13, the saw guard 142 is carried for pivotal movement by a vertical pin 143 journalled in the upper block 110. By means of this arrangement, the saw guard 142 may be pivoted into saw guarding position or into a parked position while the saw band is being removed from the saw guide 44. A thumb screw 144 threaded in the upper block 110 of the guide 44 is provided to lock the saw guard 142 to the support block in saw guarding position.

Inasmuch as the saw guides 44 and 45 are of generally similar construction, only the upper guide 44 will be described in detail. As shown in Figs. 10 and 11, the upper support block 110 is provided with a laterally offset circular recess formed rearwardly of the central portion of the laminated guide members 111 and 112 in manner to receive a rotatable thrust roller 145. The thrust roller 145 is journalled on a stub shaft 146, carried toward one side of the block 110, for rotation in a plane transverse to the plane of the guiding slot formed by the opposed laminated guide members 111 and 112 about an axis which is laterally offset therefrom. Thus, the saw band 35 threaded through the guiding slot defined by the laminated guide members 111 and 112 is restrained against rearward movement by having its rearward edge engage the forward side face of the rotatable thrust roller 145 along a line that is laterally offset from the axis thereof.

Each of the opposed laminated guide members 111 and 112 of the upper saw guide 44 is slidably carried for movement toward or away from each other in the same vertical plane on flat vertical bearing surfaces formed on the front face of the upper support block 110, as shown in Figs. 10, 11 and 12. To limit the degree of lateral adjustment, each of the laminated guide members 111 and 112 is provided with a pair of horizontally elongated slots 147 and 148 respectively, arranged to receive clamping bolts 149 and 150, which extend therethrough to threadedly engage the support block 110 and which are operative to clamp the guide members in a selected position of lateral adjustment.

In addition to being laterally adjustable for varying the width of the guiding slot to accommodate different thicknesses of saw bands, the opposed laminated guide members 111 and 112 of the upper saw guide 44 are individually adjustable in manner to vary the depth of the guiding slot formed therebetween for accommodating different widths of saw bands, as shown in Figs. 12, 13 and 14. To effect this result, each of the laminated guide members 111 and 112 is composed of a plurality of slidably superimposed individual guide plates or laminae 152, 153 and 154 provided with a pair of horizontally elongated guiding slots 147 and 148, as shown in Fig. 10, arranged to be engaged by the clamp bolts 149 and 150. Each of the individually opposed guide plates 152, 153 and 154 is provided with a pair of vertically spaced, inwardly opposed guiding edges 113 and 114 disposed in parallelism and perpendicular to the plane in which the guide plates are slidable.

To provide a slot of maximum depth for accommodating the comparatively wide saw band 35, as shown in Figs. 10, 11 and 12, each of the individual guide plates 152, 153 and 154 constituting the laminated guide elements 111 and 112 are so positioned that the vertically spaced bearing surfaces 113 and 114 of each guide plate are in the same plane to form continuous full depth bearing surfaces for guiding the saw band. To provide a slot for accommodating a saw band of intermediate width, as shown in Fig. 13, the outer opposed guide plates 154 of the laminated guide members 111 and 112 are retracted from saw engaging position to leave only the inner opposed guide plates 152 and 153 thereof in position to define a saw guiding slot. For guiding a narrow saw band, as shown in Fig. 14, both of the outer opposed guide plates 154 and 153 of the laminated members are retracted to leave only the innermost opposed guide plates 152 thereof in position to define a slot for guiding the saw band.

Figure 15:
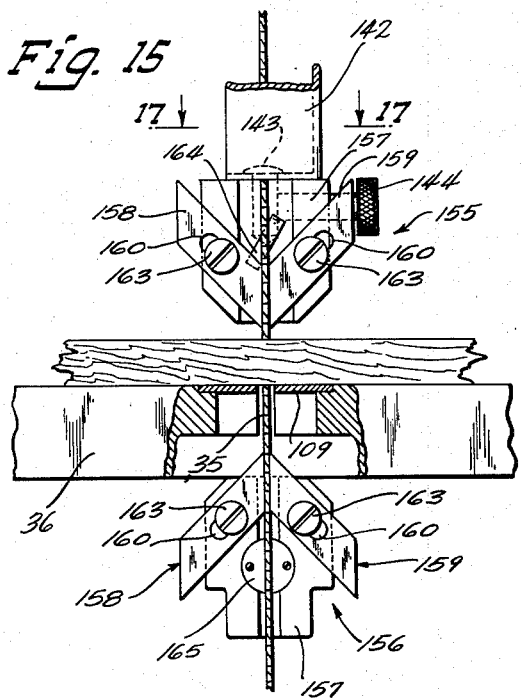
Fig. 15 is an enlarged detailed view in front elevation of a pair of adjustable saw guides of modified form.
Figure 16:
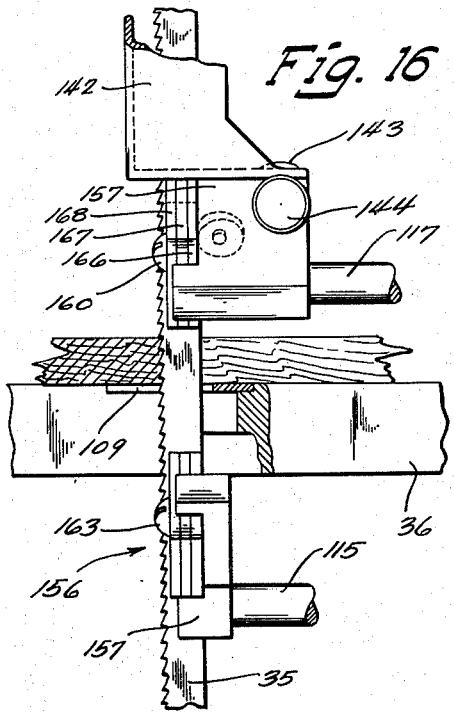
Fig. 16 is an enlarged view in right side elevation of the modified form of saw guides.

In a modified form of apparatus for guiding a saw band, as shown in Figs. 15 and 16, there are provided a pair of vertically spaced saw band guides 155 and 156 respectively carried by the laterally and vertically adjustable rod 117 and the laterally adjustable rod 115 in vertically spaced positions above and below the work supporting table 36. As there shown, each of the saw band guides 155 and 156 includes a supporting block 157 provided with angularly converging guideways respectively disposed to support a pair of opposed laminated guide members 158 and 159 for slidable adjustable movement toward or away from each other in the same plane.

Each of the opposed laminated guide members 158 and 159 is provided with an elongated slot 160 disposed to receive a clamping screw 163 extending therethrough to threadedly engage the support block for clamping the guide members in predetermined adjusted position and for limiting the longitudinal movement thereof.

To restrain the saw band 35 threaded between the opposed laminated guide members 158 and 159 against rearwardly movement, the upper saw guide 155 is provided with a thrust roller 164 rotatably carried by the upper support block 157 in a position rearwardly of the guiding slot defined by the opposed guide members 158 and 159. The thrust roller 164 is journalled on an axis lying in a plane parallel to the plane in which the guide members 158 and 159 are movable, for rotation in a plane that angularly intersects the vertical plane of the guiding slot defined by the guide members.

Thus, the saw band 35 restrained against lateral movement by the opposed laminated guide members 158 and 159 will be guided for straight line movement in a plane diagonal to the plane of rotation of the roller 164 and in manner that the rearward edge of the saw band diagonally engages the peripheral rim of the thrust roller.

The lower saw guide 156 is provided with a guide shoe 165 carried by the lower support block 157 in a position rearwardly of the guide members 158 and 159 in manner to engage the rearward edge of the saw band 35. A saw band threaded through the upper saw guide 155 and the lower saw guide 156 therefore, will be restrained against rearwardly movement by the rotatable thrust roller 164 carried by the upper support block 157 and the stationary guide shoe 165 carried by the lower support block 157.

Figures 17, 18:
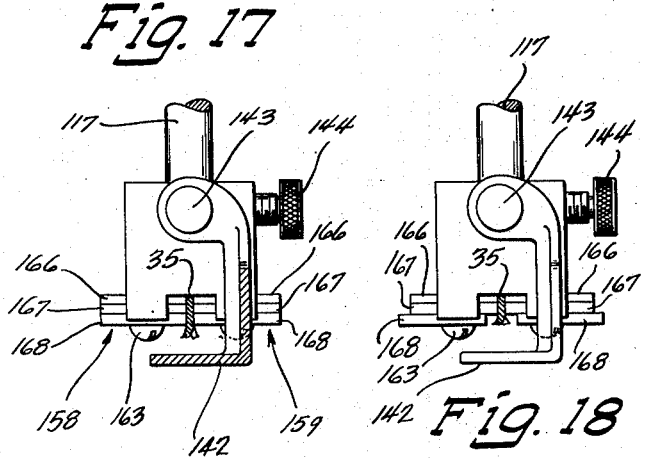
Fig. 17 is a plan view of the upper modified form of saw guide taken on a plane represented by the line 17—17 in Fig. 15.
Fig. 18 is a plan view of the upper modified form of saw guide showing the outer opposed guide plates in retracted position.
Figure 19:
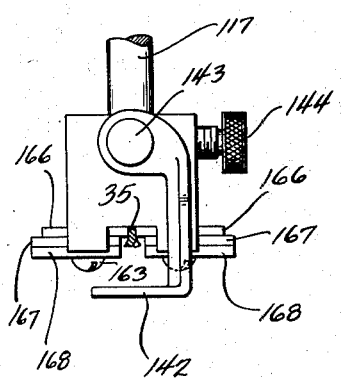
Fig. 19 is a plan view of the upper modified form of saw guide showing only the innermost opposed guide plates in saw guiding engagement.

Each of the opposed laminated saw guides 158 and 159 is composed of a plurality of individual guide plates or laminae 166, 167 and 168 slidably superimposed upon each other for selectively individual adjustment in manner to vary the depth of the guiding slot formed therebetween. The separate guide plates 166, 167 and 168 are each provided with an elongated slot 160 disposed to be engaged by the clamping screws 163 and are arranged to have their inner angular ends disposed in parallelism and in a plane perpendicular to the plane in which the guide plates are movable. As shown in Figs. 17, 18 and 19, the separate guide plates 166, 167 and 168 constituting the opposed laminated guide members 158 and 159 may be so positioned as to define a slot of varying depth for guiding a saw band of wide, intermediate or narrow width, respectively.

In the event the endless saw band 35 breaks during a sawing operation, or in the event it is necessary to sever the saw band to insert it in an opening in the workpiece before performing a particular sawing operation, it is advantageous to weld the ends of the saw band together in as expeditious a manner as possible. To this end, as shown in Figs. 1, 2, and 6, the saw band welding apparatus 47 carried by the parking bracket 46 rearwardly of the vertical column 48 may be moved to a convenient operating position adjacent to the open throat 34 constituting the working zone and in proximity to the normal path of travel of the rearward stretch of the saw band 35 to facilitate welding the ends of the saw band after it has been broken or severed. The welding apparatus 47, which is operative in well known manner, is pivotally supported on the outer end of a horizontal arm 170 for rotatable movement about a vertical axis. The arm 170, in turn, is rotatably supported at its inner end by a bracket 171 bolted to the rearward wall of the column 48 for pivotal adjustment in a horizontal plane. Whenever the welding apparatus 47 is not being used therefore, it may be pivotally moved to a parked or storage position rearwardly of the machine column 48, as shown in Fig. 7, to permit unobstructed access to the sides of the machine for greater convenience in performing sawing operations.

Power for driving the saw band 35 at a selected speed in a high or a low range is derived from the motor 38 which is carried for a relatively slight vertical adjustment on a motor support plate 172 pivotally mounted within the hollow base 39 of the machine, as shown in Figs. 1 and 2. From a multiple grooved, stepped driving pulley 173 keyed to the motor shaft, power is transmitted by means of a belt 174 to drive a stepped pulley 175 rotatably journalled toward the outer end of an independently rotatable transmission shaft 176 journalled in the range changing mechanism 41, as shown in Figs. 2 and 20. The multiple grooved stepped pulleys 173 and 175, together with the power transmitting belt 174, are operative in well known manner to constitute the selectively adjustable stepped speed changer 40.

To facilitate the adjustment of the belt 174 about the stepped pulleys 173 and 175 for selectively varying the driving ratio therebetween, there is provided toward the lower rightward part of the machine, a foot pedal 178 pivotally carried by an outer wall of the machine base 39 in manner to engage with its opposite inner end 179 the underside of the pivotally movable motor support plate 172. Depressing the foot pedal 178 operates to pivot the inner end of the motor plate 172 upwardly which, in turn, effects upward movement of the driving pulley 173 toward the driven pulley 175 for facilitating the manual adjustment of the belt 174 about the pulleys.

To limit pivotal movement of the motor plate 172, as well as to provide a proper driving tension on the belt 174, a vertical stud 180 secured within the base 39 is disposed to engage the outer end of the motor support plate 172. A pair of springs 181 and 182 carried by the stud 180 on the opposite sides of the motor support plate 172 are operable to resiliently limit the pivotal movement thereof.

The range changing mechanism 41 is contained within a housing 183 secured at its inner side to a hollow cylindrical housing 184 integrally formed with and extending laterally outward from the lower wheel support 50 by means of cap screws 185. The underside of the housing 183 is supported upon the upper surface of the hollow base 39 by means of a jackscrew 186 interposed therebetween.

The range changing mechanism 41 shown in Figs. 2 and 20 comprises essentially a pair of clutches 187 and 188 selectively actuatable to transmit power from the stepped driven pulley 175 to rotate the saw driving transmission shaft 176 at a selected speed in a high or a low range. The saw driving transmission shaft 176 is journaled toward its outer end to rotate in a bearing 189 carried by an outboard support 190 bolted directly to the housing 183 and at its inner end in a pair of axially spaced bearings 192 and 193 carried within the circular housing 184 secured to the lower wheel support 50. At its extreme inner end, the transmission shaft 176 is provided with a slight taper 194 corresponding with a complementary tapered bore formed in the hub 195 of the lower saw guiding and driving wheel 33. The lower guiding wheel 33 is keyed to the inner tapered end 194 of the shaft 176 and secured thereto by means of a lock washer 196 and a cap screw 197 for rotation within the housing formed by the lower wheel support 50.

The range changing clutches 187 and 188 respectively are provided with hollow circular outer housings 198 and 199 respectively connected to be driven throughout low and high speed ranges. The high range clutch housing 199 is provided with an outwardly extending, elongated hub 202 integrally formed therewith and is journalled to rotate on the rightward end of the transmission driving shaft 176 on sleeve bearings 203 and 204. For driving the rightward clutch housing 199 in a high range, the upper multiple groove pulley 175 is keyed directly to the elongated hub 202 integrally formed therewith.

The clutch housing 198 of the low range clutch 187 is provided with an extending hub 205 of reduced diameter that is journalled to rotate on the central portion of the transmission driving shaft 176, on sleeve bearings 206 and 207. For transmitting power from the pulley 175 to drive the clutch housing 198 at a reduced range of driving speeds, a pinion 208 keyed to the hub 202 of the rightward high range clutch housing 199 is operatively connected to engage an enlarged spur gear 209 secured to a jackshaft 210 which is, in turn, journaled to rotate in the lower portion of the housing 183. A pinion 211 secured to the opposite end of the jackshaft 210 is disposed to engage gear teeth 212 formed on the periphery of the low range clutch housing 198.

To transmit power from the leftward clutch housing 198 for driving the transmission shaft 176 in the low range, an inner clutch element 214 keyed to the shaft 176 is provided with driven clutch plates 215 arranged to be engageable with driving clutch plates 216 slidably keyed at their outer periphery within the clutch housing 198. A cover plate 217 secured to the clutch housing 198 by means of cap screws is threaded to receive a rotatable adjusting element 219 disposed to be retained in adjusted position by means of a lock screw 220. Toward its inner, forward portion, the adjusting element 219 is provided with an outwardly inclined circular guideway 221 arranged to guide a plurality of actuating balls 222, circumferentially spaced about the inner clutch element 214, for outward movement into wedging engagement with a clutch actuating plate 223 to effect driving engagement between the driving clutch plates 216 and the driven clutch plates 215.

In a similar manner, the rightward high range clutch 188 is provided with a plurality of driving clutch plates 225 and driven clutch plates 226 selectively engageable to transmit power from the outer clutch housing 199 to drive the transmission shaft 176. A plurality of clutch actuating balls 227 are retained in circumferentially spaced relationship about an inner clutch element 228 by an outwardly inclined circular guideway formed at the inner beveled edge of a circular adjusting element 230 carried in a clutch cover plate 231 whenever the high range clutch 188 is disengaged, as shown in Fig. 22.

To effect selective engagement of the clutch 187 or the clutch 188, there is provided intermediately of the clutches an actuating sleeve 232 slidably carried on the transmission shaft 176 for axial movement. Adjacent to its oppositely beveled ends, the actuating sleeve 232 is provided with a pair of ball races 233 and 234 respectively disposed to be engaged by the clutch actuating balls 222 or 227. As the sleeve 232 is moved leftwardly to effect engagement of the low range clutch 187, the beveled or tapered leftward end thereof operates to move the actuating balls 222 outwardly to exert pressure between the angularly inclined circular guideway 221 of the adjusting element 219 and the axially slidable clutch actuating plate 223. With the sleeve 232 moved to its limit of leftward movement, the actuating balls 222 will be seated in the ball race 233, as shown in Fig. 20, in which position the balls will function in a manner similar to a detent mechanism for retaining the sleeve in its leftward position and thus maintaining the clutch plates 215 and 216 in driving engagement.

In a similar manner, the actuating sleeve 232 is axially movable to its extreme rightward position to effect a driving engagement between the clutch plates 225 and 226 of the high range clutch 188. In the event neither of the clutches 187 and 188 is to be engaged, the actuating sleeve 232 is movable to a central neutral position intermediately of the clutches, as shown in Fig. 2.

For effecting selective axial movement of the actuating sleeve 232 in either direction from its neutral position, Fig. 2, to effect engagement of either the low range clutch 187 or the high range clutch 188, there is journalled on the upper surface of the range changing housing 183 a control lever 235. The control lever 235 is secured to the outer end of a vertical shaft 236 journalled to rotate in a support bracket 237 secured to the upper surface of the housing. At its inner end, as shown in Figs. 20 and 21, the vertical shaft 236 is provided with an eccentric arm 238 disposed to engage the upper end of a laterally pivotable shifter fork 239 that is pivotally carried between a pair of spaced arms 240 and 241 depending from the underside of the bracket 237. The lower forked end of the shifter fork 239 engages an annular groove 242 formed on the central portion of the axially slidable clutch actuating sleeve 232.

Referring now to Figs. 5 and 22, the modified form of a speed changing mechanism 244 there shown is interposed between the motor 38 and the range changing mechanism 41 for transmitting power therebetween to drive the continuous saw band 35 throughout an infinitely variable selection of speeds in a high and low range. The infinitely variable speed changing transmission mechanism 244 comprises essentially an intermediate pulley unit 245 of the expansible variable pitch type rotatably carried toward the outer end of one arm 246 of a movable bell crank 247 which, in turn, is pivotally supported by the machine base 39. A driving pulley 248 keyed to the shaft of the motor 38 and a driven pulley 249 keyed to the outwardly extending hub 202 of the high range clutch housing 199 are rotatable in a plane parallel to the plane of rotation of the intermediate pulley unit 245 and are interconnected therewith by means of a lower driving belt 250 and an upper driving belt 251, respectively.

The intermediate pulley unit 245 is provided with an axially floating center section 252 which is slidably keyed on a pulley hub 253 for movement between a pair of fixed end sections 254 and 255 secured to the opposite ends thereof, in well known manner. The lower driving belt 250 is trained about the lower motor pulley 248 and a groove 256 of variable diameter formed between the axially floating center section 252 and the leftward end section 254 of the intermediate pulley unit 245. In a similar manner, the upper driven belt 251 is trained about the upper pulley 249 and a groove 257 of variable diameter formed between the movable center section 252 and the rightward end section 255 of the pulley unit 245. Bodily downward movement of the intermediate pulley unit 245 operates in well known manner through the action of the cooperating belts to effect leftward movement of the axially movable center section 252 thereof to increase the effective driving diameter of the pulley groove 256 and to decrease the driving diameter of the groove 257 for decreasing the rate of speed of the driven pulley 249. Conversely, upward movement of the intermediate pulley unit 245 operates through the action of the cooperating belts to increase the speed of the driven pulley 249.

To effect selective upward or downward movement of the intermediate pulley unit 245, the bell crank 247 is forked at its opposite end in manner to engage a circular pilot 258 secured to a traveling adjusting nut 259 threaded on the inner end of an adjusting screw 260. The adjusting screw 260 is journalled to rotate in an extending arm 261 secured to the machine base 39 and is provided at its outer end with a handwheel 262 which is operative to rotate the shaft for effecting selective longitudinal movement of the adjusting nut 259 in manner to move the bell crank for effecting upward or downward bodily movement of the intermediate pulley unit 245.

From the foregoing description and explanation of the construction and operation of the band sawing machine herein set forth as exemplifying the invention, it is apparent that there has been provided an improved economically constructed unit type frame structure incorporating improved saw guarding means for protecting a machine operator, and that is disposed to support the sawing mechanism including an endless saw band with a maximum of rigidity during a sawing operation, as well as improved means for guiding and controlling the speed of operation of the endless saw band in manner to provide for operating the machine conveniently and efficiently in performing a particular sawing operation.

Although the illustrative embodiments of the invention have been described in considerable detail for the purpose of setting forth a practical exemplifying apparatus, it is to be understood that the particular structure and control means herein described are intended to be illustrative only and that the various inventive features may be incorporated in other structural forms without departing from the spirit and scope of the invention as defined in the subjoined claims.

The principles of the invention having now been fully explained in connection with the foregoing description of embodying structure, I hereby claim as my invention:

1. In a band sawing machine having a pair of spaced saw guiding wheels, a generally C-shaped supporting frame comprising a vertically upstanding column provided with a front wall presenting upper and lower flat vertical mounting surfaces lying in parallel vertical planes, and a pair of wheel supports formed in the shape of hollow open sided housings presenting flat mounting surfaces and being releasably secured to said column in predeterminately adjusted vertically spaced relationship, said wheel supports being respectively disposed to rotatably support and partially enclose said saw guiding wheels.

2. In a generally C-shaped supporting frame for a band saw, a hollow vertically upstanding column presenting an unbroken front wall extending from the top to the bottom thereof, a pair of wheel supports formed in the shape of hollow open sided housings removably secured to the front wall of said column in predeterminately adjusted vertically spaced relationship in the same plane, a pair of rotatable saw guiding wheels respectively carried by said wheel supports in manner to be partially enclosed thereby, and a pair of access doors hinged to said column in manner to cooperate with said wheel supports for completely enclosing said saw guiding wheels.

3. In a frame for a band sawing machine, an upper wheel support comprising a substantially flat side wall and an integrally formed peripheral flange substantially perpendicular thereto, said upper wheel support constituting an open sided protective housing and presenting on one external side of the said integrally formed flange a flat mounting surface, an upper saw guiding wheel journalled within the said housing constituted by said upper support for rotation about an axis parallel to the said flat mounting surface presented thereby, a lower wheel support comprising a substantially flat side wall and an integrally formed peripheral flange substantially perpendicular thereto, said lower wheel support constituting an open sided protective housing presenting on one external side of the said integrally formed flange a flat mounting surface, a lower saw guiding wheel journalled to the said lower support within the said housing constituted thereby for rotation about an axis parallel to the said flat mounting surface presented by said support, an upstanding hollow column member presenting on its front face vertically spaced apart upper and lower flat vertical mounting surfaces formed in the same vertical plane, said column member being adapted to rigidly carry said upper and lower wheel supports in laterally extending vertically spaced relationship, said upper and lower wheel supports being laterally and tiltably positionable along the front face of said column with the said flat mounting surfaces presented by said supports being maintained in abutting engagement with the said flat mounting surfaces respectively presented by said column for positioning the said wheels journalled in said supports in the same vertical plane, and releasable means connected to rigidly clamp said supports to said column in predetermined vertical alignment whereby the said supports constituting protective wheel housings are adjustably secured to said column to predeterminately align the said wheels journalled in said supports and thus compensate for slight variations in manufacture.

4. As an article of manufacture, a band saw frame comprising a hollow vertically upstanding column of substantially rectangular cross section, said column being provided with unbroken vertical side walls joined at their forward edges by a solid unbroken front wall having a plurality of forwardly projecting upper and lower mounting pads respectively presenting flat vertical mounting surfaces formed in the same vertical plane, an upper wheel support having a side wall integrally formed with a laterally extending peripheral flange to constitute an open sided protective housing for a saw guiding wheel, said upper support being provided with a plurality of mounting pads extending outwardly from one external side of the said flange associated therewith and presenting flat mounting surfaces formed in the same plane, said upper wheel support being removably and fixedly secured to said column in predetermined tiltably and laterally adjusted position with the said flat mounting surfaces presented by said support in rigidly abutting engagement with the said upper vertical flat mounting surfaces presented by said column, a lower wheel support having a side wall integrally formed with a laterally extending peripheral flange to constitute an open sided protective housing for a saw guiding wheel, said lower support being provided with a plurality of mounting pads extending outwardly from one external side of the said peripheral flange associated therewith and presenting flat mounting surfaces formed in the same plane, said lower wheel support being removably and fixedly secured to said column in predetermined tiltably and laterally adjusted position with the said flat mounting surfaces presented by said lower support in rigidly abutting engagement with the said lower flat mounting surfaces presented by said column, and means for securing said upper and lower wheel supports to said column in predetermined tiltably and laterally adjusted position.

5. In a frame for a band sawing machine provided with a pair of spaced apart saw guiding wheels, an endless saw band trained about said guiding wheels, an upper wheel housing adapted to rotatably support one of said saw guiding wheels, said housing presenting a flat vertical mounting surface parallel to the axis of rotation of the said wheel supported thereby, a lower wheel housing adapted to rotatably support the other of the said saw guiding wheels, said lower housing presenting a flat vertical mounting surface parallel to the axis of rotation of the said saw guiding wheel carried thereby, a vertically upstanding column presenting vertical flat mounting surfaces formed in the same vertical plane and adapted to support said upper and lower housings in laterally extending vertically spaced relationship, said housings being tiltably and laterally adjustable relative to said column with the said flat mounting surfaces respectively presented by said housings in abutting engagement with the said flat mounting surfaces presented by said column, said housings being adjustably positionable on said column to bring the said wheels carried thereby into exact vertical alignment, interconnecting positioning means adapted to retain said housings in exact predetermined vertical alignment along said column, and removable means connected to secure said housings rigidly to said column in predetermined aligned relationship as determined by said positioning means with the said flat mounting surfaces respectively presented by said housings being clamped in rigidly abutting engagement with the respective said flat mounting surfaces presented by said column.

6. In a band sawing machine, a pair of open sided protective housings respectively comprising a flat side wall and an integrally formed laterally extending peripheral flange, said housings being provided with mounting pads extending outwardly from the outer side of the said flanges formed therewith and presenting flat mounting surfaces, a pair of saw guiding wheels respectively journalled within said housings for rotation about axes lying in a plane parallel to a plane passing through the flat mounting surfaces of the said respective pads, an upstanding hollow column provided with unbroken vertical side walls joined at their forward edges by an unbroken solid front wall provided with a plurality of vertically spaced mounting pads extending forwardly therefrom to present vertical flat mounting surfaces lying in parallel vertical planes, said column being adapted to carry said housings with the mounting pads thereon being retained in abutting engagement with the said pads on said column, said housings being laterally and tiltably positionable along said column mounting pads to move the said guiding wheels carried thereby into exact vertical alignment, and removable attachment means connectable to rigidly secure said housings to said column in predetermined vertical alignment in the same plane and with the said flat surfaces presented by said wheel support pads being maintained in rigid abutting engagement with the said flat surfaces presented by said column mounting pads.

7. In a band sawing machine, a hollow vertically upstanding column of substantially uniform rectangular cross section throughout its length, said column presenting a substantially solid unbroken vertically formed front wall provided with forwardly extending lower mounting pads having flat vertical mounting surfaces formed in the same vertical plane, an upper wheel support secured to the upper front wall of said column, an upper saw guiding wheel rotatably carried by said upper support for rotation in a vertical plane about an axis parallel to a plane passing through the said lower flat surfaces presented by said column mounting pads, a lower wheel support comprising a side wall and an integrally formed laterally extending peripheral flange secured to said side wall in a manner to cooperate therewith to constitute an open-sided protective housing, a lower saw guiding wheel rotatably carried by the said side wall of said lower support for rotation in a plane parallel therewith and within the said peripheral flange secured to said side wall, said lower wheel being journalled to rotate about an axis fixedly positioned with respect to said lower wheel support, said support being provided with a plurality of mounting pads extending rearwardly from one external side of the said flange associated therewith and presenting flat mounting surfaces formed in the same plane and parallel to the fixed rotational axis of said lower wheel, said lower support being removably secured to said column in predetermined tiltably adjusted position with the said flat surfaces presented by said lower wheel support mounting pads being retained in rigidly abutting engagement with the said lower flat vertical surfaces presented by said column pads, and removable attachment means connected to secure said lower wheel support rigidly to said column in a predetermined position of vertical alignment with respect to said upper saw guiding wheel.

8. As an article of manufacture, a band saw frame comprising a vertically upstanding column of substantially rectangular cross section, said column being provided with unbroken vertical front and rear walls joined at their vertical edges by unbroken side walls, a unitary upper wheel support constituting an open-sided protective housing that comprises a side wall having an integrally formed laterally extending flange secured thereto, said upper wheel support being provided with a flat mounting surface formed on one external side of the said flange associated therewith, said upper support being removably secured to the upper front wall of said column in predetermined tiltably adjusted position with the said flat mounting surface presented by said support being retained in abutting engagement with the said upper front column wall, a unitary lower wheel support constituting an open-sided protective housing comprising a side wall having an integrally formed laterally extending peripheral flange secured thereto, said lower wheel support being provided with a flat mounting surface formed on one external side of the said flange associated therewith, said lower wheel support being removably secured to said column in spaced relationship below said upper wheel support and in predetermined tiltably and laterally adjusted position relative thereto with the said flat mounting surface presented by said support being retained in abutting engagement with the said lower front column wall, and removable attachment means connected to respectively secure said upper and lower wheel supports to said column in rigid predetermined aligned position.

9. In a band sawing machine, a pair of upper and lower wheel supports respectively constituting open-sided housings adapted to partially enclose and protect a band saw wheel, said supports respectively comprising a side wall and an associated peripheral flange substantially perpendicular to said side wall, said housings being provided with flat mounting surfaces respectively formed on an external surface of the said flanges associated therewith, a pair of saw guiding wheels respectively journalled to rotate in said housings about axes respectively parallel to the said mounting surfaces formed thereon and substantially perpendicular to the said side walls associated therewith, a vertically upstanding column presenting an upper flat vertical mounting surface and a lower flat vertical mounting surface formed in parallel planes and being complementary to the said flat mounting surfaces respectively presented by said housings, said column being adapted to support said housings in vertically spaced relationship with the said flat vertical mounting surfaces on said column being in abutting engagement with the said flat mounting surfaces on said housings, said supports being adapted to be tiltably and laterally adjustable relative to said column to bring said saw guiding wheels into exact vertical alignment to compensate for slight irregularities in manufacture, means for positioning said supports on said column in predetermined adjusted vertical alignment and means for securing said supports to said column in a predetermined aligned position.

References Cited in the file of this patent

UNITED STATES PATENTS

| Number | Name | Date |
|---|---|---|
| 491,683 | Hinkley et al. | Feb. 14, 1893 |
| 1,270,285 | Good | June 25, 1918 |
| 1,511,788 | Vaughan | Oct. 14, 1924 |
| 1,811,906 | Andre | June 30, 1931 |
| 1,866,395 | Campbell | July 5, 1932 |
| 1,870,402 | Carter | Aug. 9, 1932 |
| 1,870,774 | Gaines | Aug. 9, 1932 |
| 2,040,718 | Tautz | May 12, 1936 |
| 2,081,033 | Biro | May 18, 1937 |
| 2,180,079 | Wilkie | Nov. 14, 1939 |
| 2,309,864 | Patterson | Feb. 2, 1943 |
| 2,311,426 | Wilkie | Feb. 16, 1943 |
| 2,320,713 | Brotman | June 1, 1943 |
| 2,347,765 | Boice et al. | May 2, 1944 |
| 2,384,364 | Boice et al. | Sept. 4, 1945 |
| 2,572,506 | Mongelli et al. | Oct. 23, 1951 |
| 2,604,126 | Wiken et al. | July 22, 1952 |